United States Patent
Abraham et al.

(10) Patent No.: US 9,952,333 B2
(45) Date of Patent: Apr. 24, 2018

(54) HYBRID PHOTON COUNTING DATA ACQUISITION SYSTEM

(71) Applicant: ANALOGIC CORPORATION, Peabody, MA (US)

(72) Inventors: Douglas Q. Abraham, Topsfield, MA (US); Basak Ulker Karbeyaz, Concord, MA (US)

(73) Assignee: ANALOGIC CORPORATION, Peabody, MA (US)

( * ) Notice: Subject to any disclaimer, the term of this patent is extended or adjusted under 35 U.S.C. 154(b) by 46 days.

(21) Appl. No.: 15/024,890

(22) PCT Filed: Sep. 25, 2013

(86) PCT No.: PCT/US2013/061713
§ 371 (c)(1),
(2) Date: Mar. 25, 2016

(87) PCT Pub. No.: WO2015/047252
PCT Pub. Date: Apr. 2, 2015

(65) Prior Publication Data
US 2016/0238717 A1    Aug. 18, 2016

(51) Int. Cl.
*G01T 1/17*    (2006.01)
(52) U.S. Cl.
CPC ........................... *G01T 1/17* (2013.01)
(58) Field of Classification Search
CPC ........................................... G01T 1/17
See application file for complete search history.

(56) References Cited

FOREIGN PATENT DOCUMENTS

WO        9013829 A1    11/1990
WO     2013003497 A1     1/2013

OTHER PUBLICATIONS

International Search Report cited in related application No. PCT/US13/61713 dated May 30, 2014, pp. 17.
Kraft, et al., "Counting and Integrating Readout for Direct Conversion X-Ray Imaging- Concept, Realization and First Prototype Measurements", Nuclear Science Symposium Conference Record, 2005, IEEE Wyndham El Conquistador Resort, Puerto Rico Oct. 23-29, 2005, vol. 5, Oct. 23, 2005, pp. 2761-2765.

(Continued)

*Primary Examiner* — Casey Bryant
(74) *Attorney, Agent, or Firm* — Cooper Legal Group, LLC

(57) ABSTRACT

Among other things, one or more techniques and/or systems are described for resetting an integration circuit (206) of a detector cell or an electronics arrangement (200) thereof. When a voltage signal output by the integration circuit (206) exceeds a specified threshold (e.g., indicating that a specified number of radiation photons have been detected), a charge injection circuit (208) is configured to inject charge into the integration circuit (206). The injected charge is typically opposite in polarity to stored charge that is stored by a capacitor (214) of the integration circuit (206) and is configured to counteract the stored charge. In this way, a voltage potential at the capacitor (214) decreases, causing the voltage signal output by the integration circuit (206) to decrease. Moreover, a number of resets per measurement interval may be recorded to determine an average current output by a radiation detection element of the detector cell over the measurement interval to facilitate acquiring photon integration readings.

20 Claims, 6 Drawing Sheets

(56) References Cited

OTHER PUBLICATIONS

Kraft, et al., "3 Circuits for Digital X-Ray Imaging: Counting and Integration", URL:http://onlinelibrary.wiley.com/store/I0.1002/9780470451816.ch3/asset/ch3.pdf?v=1&t=hta2mmn4&s=354ea8ge83ff4c2elbff76cfc96ccee61d19febl, Jan. 1, 2009, pp. 59-77.

| | Scenario 1 | Scenario 2 | Scenario 3 | Scenario 4 |
|---|---|---|---|---|
| Maximum Photons/View | 1000 | 1000 | 2000 | 2000 |
| Signal-to-Noise Ratio | 31.6 ($\sqrt{1000}$) | 31.6 ($\sqrt{1000}$) | 44.7 ($\sqrt{2000}$) | 44.7 ($\sqrt{2000}$) |
| Integrator Noise Factor | 10 | 4 | 10 | 4 |
| Maximum Integration Circuit Noise | 3.2 (31.6/10) | 7.9 (31.6/4) | 4.5 (44.7/10) | 11.2 (44.7/4) |
| RMS Quantization Error | 0.29 ($1/\sqrt{12}$) | 0.29 ($1/\sqrt{12}$) | 0.29 ($1/\sqrt{12}$) | 0.29 ($1/\sqrt{12}$) |
| Photons/Reset | 11 (3.2*1/0.29) | 27 (7.9*3.5) | 15 (4.5*3.5) | 39 (11.2*3.5) |
| Injected Charge | $2.1*10^{-14}$ (11*1.9224*$10^{-15}$) | $5.2*10^{-14}$ (27*1.9224*$10^{-15}$) | $2.9*10^{-14}$ (15*1.9224*$10^{-15}$) | $7.5*10^{-14}$ (39*1.9224*$10^{-15}$) |

FIG. 5

HYBRID PHOTON COUNTING DATA ACQUISITION SYSTEM

BACKGROUND

The present application relates to the field of radiation imaging systems. It finds particular application to data acquisition systems of radiation imaging systems that use photon counting detector arrays to measure a number and/or energy of radiation photons impinging thereon.

Today, radiation imaging systems such as computed tomography (CT) systems, single-photon emission computed tomography (SPECT) systems, projection systems, and/or line-scan systems, for example, are useful to provide information, or images, of interior aspects of an object under examination. Generally, the object is exposed to radiation comprising photons (e.g., x-rays, gamma rays, etc.), and an image(s) is formed based upon the radiation absorbed and/or attenuated by interior aspects of the object, or rather an amount of radiation photons that is able to pass through the object. Generally, highly dense aspects of the object absorb and/or attenuate more radiation than less dense aspects, and thus an aspect having a higher density, such as a bone or metal, for example, may be apparent when surrounded by less dense aspects, such as muscle or clothing.

Radiation imaging systems typically comprise a detector array having one or more detector cells. Respective detector cells are configured to indirectly or directly convert radiation photons impingent thereon into electrical charge which is used to generate an electrical signal. The detector cells are typically "energy integrating" or "photon counting" type detector cells (e.g., the imaging system operates in energy integrating mode or photon counting mode).

Energy integrating detector cells are configured to convert radiation energy into electrical charge. The charge generated over a period of time (e.g., at times referred to as a measurement interval) is integrated to generate a signal that is proportional to an incoming radiation photon flux rate at a detector cell. While energy integrating detector cells are widely used, there are several drawbacks to this type of cell. For example, energy integrating detectors cells are generally not able to provide feedback as to the number and/or energy of radiation photons detected. As another drawback, there is a lower limit of detection defined by noise such that a detector cell with little to no incident radiation may produce some signal due to thermal and/or analog read noise (e.g., produced by a radiation detection element and/or electronics arrangement of the detector cell). It may be appreciated that as a result of this lower limit, the dose of radiation that is applied to an object under examination is generally greater than the dose of radiation that may be applied to the object if the detector cells are of a photon counting type.

Photon counting type detector cells are configured to output a signal (e.g., a pulse) for respective detected radiation photons (e.g., where the detection of a radiation photon may be referred to as a detection event). In some embodiments, the signal (e.g., or an amplitude of the pulse) is indicative of a radiation energy of the detected radiation photon. A controller is configured to determine the location and energy of respective detected radiation photons based upon the pulse, accumulate the detection events occurring during a measurement interval, digitize the information, and/or process the digital information to form an image, for example. It may be appreciated that there are numerous advantages to photon counting type detector cells over energy integrating detector cells. For example, the counting of radiation photons is essentially noise free (e.g., apart from inherent photon shot noise). Therefore, a lower dose of radiation may be applied to the object under examination. Moreover, photon counting cells generally allow for energy or wavelength discrimination.

While photon counting type detector cells have numerous advantages over energy integrating detector cells, photon counting type detector cells have not been widely applied in some imaging modalities due to, among other things, saturation issues (e.g., pulse pile-up) at high radiation flux rates. For example, CT systems generally emit as many as $10^9$ radiation photons per millimeter squared per second and can emit radiation photons at even higher flux rates. At such high flux rates, the photon counting type detector cells may be unable to return to a normal state between the detection of a first radiation photon and a second radiation photon, which may cause two detection events to be counted as a single (e.g., higher energy) event.

SUMMARY

Aspects of the present application address the above matters, and others. According to one aspect an electronics arrangement of a photon counting detector array is provided. The electronics arrangement comprises an integration circuit configured to integrate charge generated by a detector cell of the photon counting detector array to generate a voltage signal. The electronics arrangement also comprises a charge source configured to inject an injected charge into the integration circuit in response to the voltage signal exceeding a specified threshold. The injected charge is configured to reset the integration circuit According to another aspect, a method for resetting an integration circuit of a photon counting detector array is provided. The method comprises measuring a voltage signal generated by the integration circuit. The voltage signal is indicative of a number of detection events on a detector cell since a last reset of the integration circuit. The method also comprises injecting an injected charge into the integration circuit when the voltage signal exceeds a specified threshold. The injected charge is configured to reset the integration circuit.

According to yet another aspect a radiation imaging system is provided. The system comprises an ionizing radiation source and a photon counting detector array. The photon counting detector array comprises one or more detector cells configured to detect radiation from the ionizing radiation source. A first detector cell of the photon counting detector array comprises a radiation conversion element configured to convert radiation detected by the first detector cell into charge and an electronics arrangement configured to determine a number of detection events on the first detector cell based upon the charge The electronics arrangement comprises an integration circuit configured to integrate the charge to generate a voltage signal and a charge injection circuit configured to inject an injected charge into the integration circuit in response to the voltage signal exceeding a specified threshold.

Those of ordinary skill in the art will appreciate still other aspects of the present application upon reading and understanding the appended description.

FIGURES

The application is illustrated by way of example and not limitation in the figures of the accompanying drawings, in which like references generally indicate similar elements and in which:

FIG. 5 illustrates a table of example parameters for a radiation imaging system.

DESCRIPTION

Figure 1:
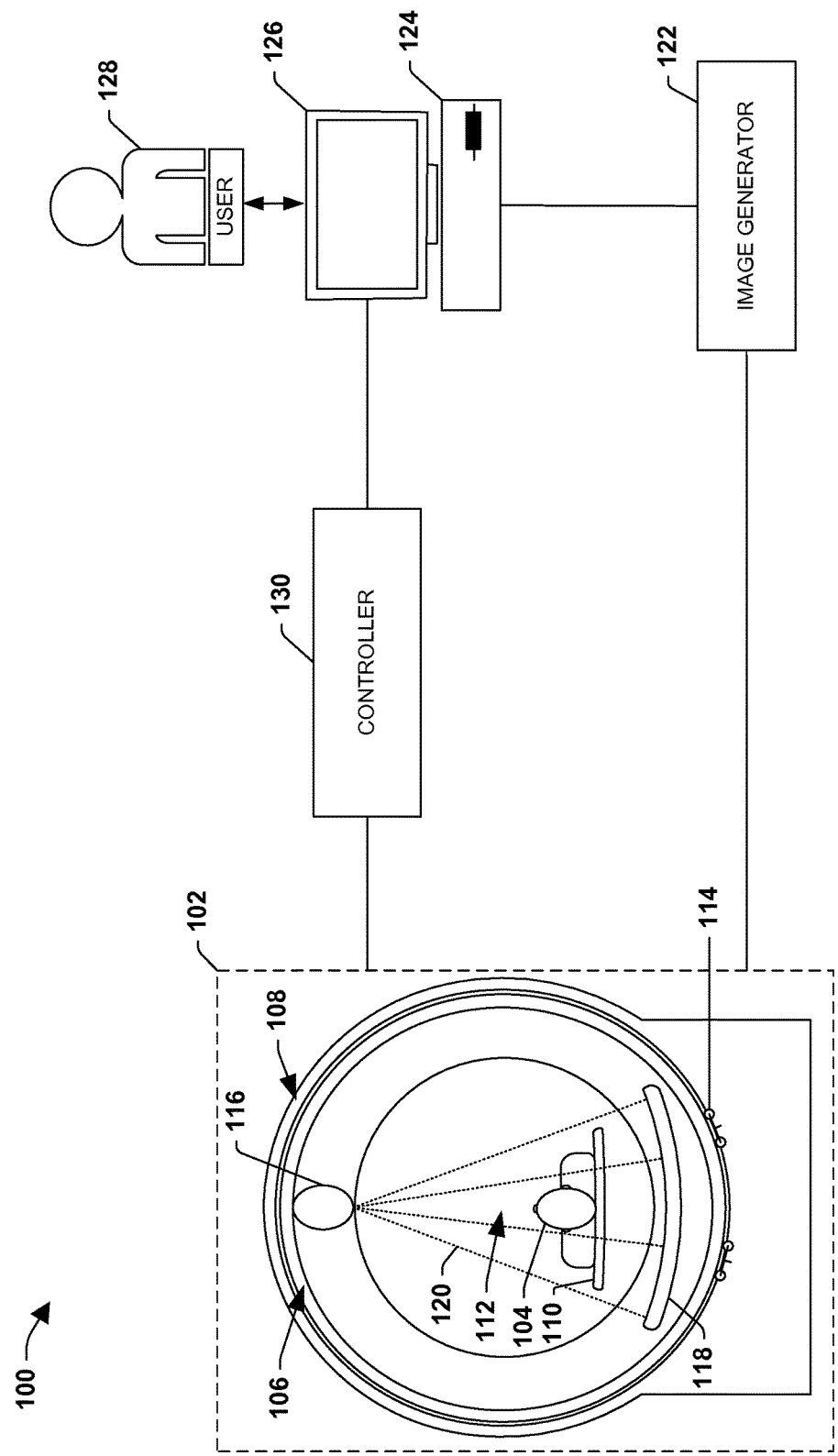
FIG. 1 illustrates an example environment of a radiation imaging system.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A detector cell of a photon counting detector array generally comprises a radiation detection element and an electronics arrangement (e.g., also referred to as a data acquisition system (DAS)). The radiation detection element is configured to detect radiation photons and to convert radiation energy of the radiation photon into electrical charge (e.g., at times referred to merely as charge). The electronics arrangement is configured to use the charge to generate a voltage signal indicative of a radiation photon (e.g., indicative of the energy of the radiation photon) and to tabulate a number and/or energy of radiation photons detected by the detector cell during respective measurement intervals (e.g., where a measurement interval may correspond to a view). It may be appreciated that while the instant application describes the electronic arrangement as being part of a detector cell, the electronics arrangement may be a physically separate component which is coupled to the radiation detection element via a communication medium (e.g., a wire, metal trace, etc.).

The electronics arrangement generally comprises, among other things, an integration circuit (e.g., also referred to as a charge amplifier or a charge-to-voltage converter) configured to convert charge, generated by the detector cell in response to a detection event, into a voltage signal by applying the charge to a capacitor of the integration circuit. The charge creates a voltage potential across the capacitor, causing a voltage signal to be generated by the integration circuit that is substantially proportional to the voltage potential across the capacitor (e.g., and in turn substantially proportional to the charge generated in response to the detection event).

Over time, the voltage potential across the capacitor may exceed a desired threshold due to the accumulation of charge at the capacitor (e.g., causing an inaccurate voltage signal to be output from the integration circuit). Accordingly, it may be desirable to intermittently and/or periodically reset the integration circuit (e.g., or a capacitor of the integration circuit) to reduce (e.g., to substantially zero) the voltage potential across the capacitor.

Accordingly, systems and/or techniques for resetting an integration circuit via a charge source are provided for herein. The charge source is configured to inject a specified amount of charge (e.g., referred to, at times, as an injected charge) into the integration circuit when a voltage signal output by the integration circuit exceeds a specified threshold. The injected charge is typically opposite in polarity to the charge stored by the capacitor (e.g., referred to, at times, as stored charge) to counteract the stored charge. In some embodiments, the injected charge is substantially inversely proportional to the stored charge (e.g., causing the stored charged to be reduced to substantially zero and the integration circuit to be substantially reset to zero or some predetermined value). In this way, by injecting charge into the integration circuit to reduce an amount of stored charge, the voltage potential across the capacitor may be reduced, causing a voltage signal (e.g., or amplitude of the voltage signal) to be reduced. Moreover, the number of times the charge source injects charge into the integration circuit during a measurement interval, such as a view, may be recorded to determine the average number of photons counted during the measurement interval.

FIG. 1 illustrates a radiation imaging system 100 comprising one or more electronics arrangements (e.g., DASs) as provided for herein. In the illustrated embodiment, the radiation imaging system 100 is a computed tomography (CT) system, although the systems and/or techniques described herein may find applicability to other radiation imaging systems such as line-scan systems, mammography systems, and/or diffraction systems, for example. Moreover, it may be appreciated that the arrangement of features, inclusion of features and/or exclusion of other features from the example radiation imaging system 100 is not intended to be interpreted in a limiting manner, such as necessarily specifying the location, inclusion, and/or relative position of the features.

The example CT system comprises an examination unit 102 configured to an examine objects 104. The examination unit 102 comprises a rotating gantry 106 and a (e.g., stationary) support structure 108 (e.g., which may encase and/or surround at least a portion of the rotating gantry 106 (e.g., as illustrated with an outer, stationary ring, surrounding an outside edge of an inner, rotating ring)). The examination unit 102 also comprises a support article 110, such as a bed or conveyor belt, configured to support the object 104 during an examination. In some embodiments, the support article 110 may be configured to translate the object into and/or through an examination region 112 (e.g., a hollow bore in the rotating gantry 106), where the object 104 is exposed to radiation 120, during the examination.

The rotating gantry 106 may surround a portion of the examination region 112 and may comprise a radiation source 116 (e.g., an ionizing radiation source such as an x-ray source or gamma-ray source) and a detector array 118. The detector array 118 is typically mounted on a substantially diametrically opposite side of the rotating gantry 106 relative to the radiation source 116, and during an examination of the object 104, the rotating gantry 106 (e.g., including the radiation source 116 and detector array 118) is rotated about the object 104 by a rotator 114 (e.g., belt, drive shaft, chain, roller truck, etc.). Because the radiation source 116 and the detector array 118 are mounted to the rotating gantry 106, a relative position between the detector array 118 and the radiation source 116 is substantially maintained during the rotation of the rotating gantry 106.

During the examination of the object 104, the radiation source 116 emits cone-beam, fan-beam, and/or other shaped radiation configurations from a focal spot of the radiation source 116 (e.g., a region within the radiation source 116 from which radiation 120 emanates) into the examination region 112. Such radiation 120 may be emitted substantially continuously and/or may be emitted intermittently (e.g., a brief pulse of radiation 120 is emitted followed by a resting period during which the radiation source 116 is not activated). Further, the radiation 120 may be emitted at a single energy spectrum or multi-energy spectrums depending upon, among other things, whether the CT system is configured as a single-energy CT system or a multi-energy (e.g., dual-energy) CT system.

As the emitted radiation 120 traverses the object 104, the radiation 120 may be attenuated (e.g., absorbed and/or scattered) differently by different aspects of the object 104. Because different aspects attenuate different percentages of the radiation 120, the number of photons detected by respective detector cells of the detector array 118 may vary. For example, detector cells that are shadowed by dense aspects of the object 104, such as a bone or metal plate, may detect fewer radiation photons (e.g., or a ratio between high energy radiation photons and low energy radiation photons may be higher) than detector cells that are shadowed by lower density aspects of the object 104, such as skin or clothing (e.g., which may allow an overall greater number of radiation photons to pass through and/or may allow a greater number of low energy radiation photons to pass through).

Respective detector cells of the detector array 118 may comprise a radiation detection element and an electronics arrangement (e.g., DAS). The radiation detection element is configured to indirectly convert and/or directly convert radiation photons into charge and the electronics arrangement is configured to generate an analog signal and/or to generate information regarding detection events.

The radiation detection element generally comprises a conversation material and a thin-film transistor (TFT) array configured to detect/accumulate charge generated in response to a detection event. In a direct conversion detector array, the conversion material is configured to convert the radiation photons into electrical charge. Example conversion materials of a direct conversion detector array include, among other things, Cadmium Zinc Telluride, Cadmium Telluride, Silicon, and/or an amorphous material. In an indirect conversion detector array, the conversion material is configured to convert the radiation photons into light energy, and the radiation detection element further comprises a photodetector (e.g., a photodiode, such as a back-illuminated photodiode) configured to convert the light energy into electrical charge. Example conversion materials of an indirect conversion detector array (e.g., also referred to as a scintillator material) include, among other things, Cadmium Tungstate, Bismuth Germanate, Cesium Iodide, Sodium Iodide and/or Lutetium Orthosilicate.

The electronics arrangement of the detector array 118 is generally configured to convert the electrical charge into a voltage signal and/or process the voltage signal. Such processing may include filtering, shaping, and/or measuring the voltage signal to generate useful information regarding respective detection events on a detector cell. By way of example, in some embodiments, the electronics arrangement comprises an integration circuit configured to generate a voltage signal proportional to the charge produced in response to a detection event and/or a photon counting circuit configured to count and/or tabulate (e.g., record) a number of detection events and/or an energy of respective detection events.

In some embodiments, the electronics arrangement is also configured to compile information recorded during a measurement interval (e.g., a view). The information represents the attenuation of radiation through the object while the radiation source 116 and/or detector array 118 were at a particular angular location (e.g., or angular range) relative to the object 104.

Information generated and/or compiled by the electronics arrangement may be transmitted to an image generator 122 configured to generate an image(s) of the object 104 using the information. Such images may depict a two dimensional representation of the object 104 and/or a three dimensional representation of the object 104. In other embodiments, the information may be transmitted to other digital processing components, such as a threat analysis component, for processing.

The example environment 100 also includes a terminal 124, or workstation (e.g., a computer), configured to receive image(s) from the image generator 122, which can be displayed on a monitor 126 to a user 128 (e.g., security personnel, medical personnel, etc.). In this way, the user 128 can inspect the image(s) to identify areas of interest within the object(s) 104. The terminal 124 can also be configured to receive user input which can direct operations of the examination unit 102 (e.g., a speed of gantry rotation, an energy level of the radiation, etc.).

In the example environment 100, a controller 130 is operably coupled to the terminal 124. The controller 130 may be configured to control operations of the examination unit 102, for example. By way of example, in some embodiments, the controller 130 may be configured to receive information from the terminal 124 and to issue instructions to the examination unit 102 indicative of the received information (e.g., adjust a speed of a conveyor belt, adjust a voltage applied to the radiation source 116, etc.).

Figure 2:
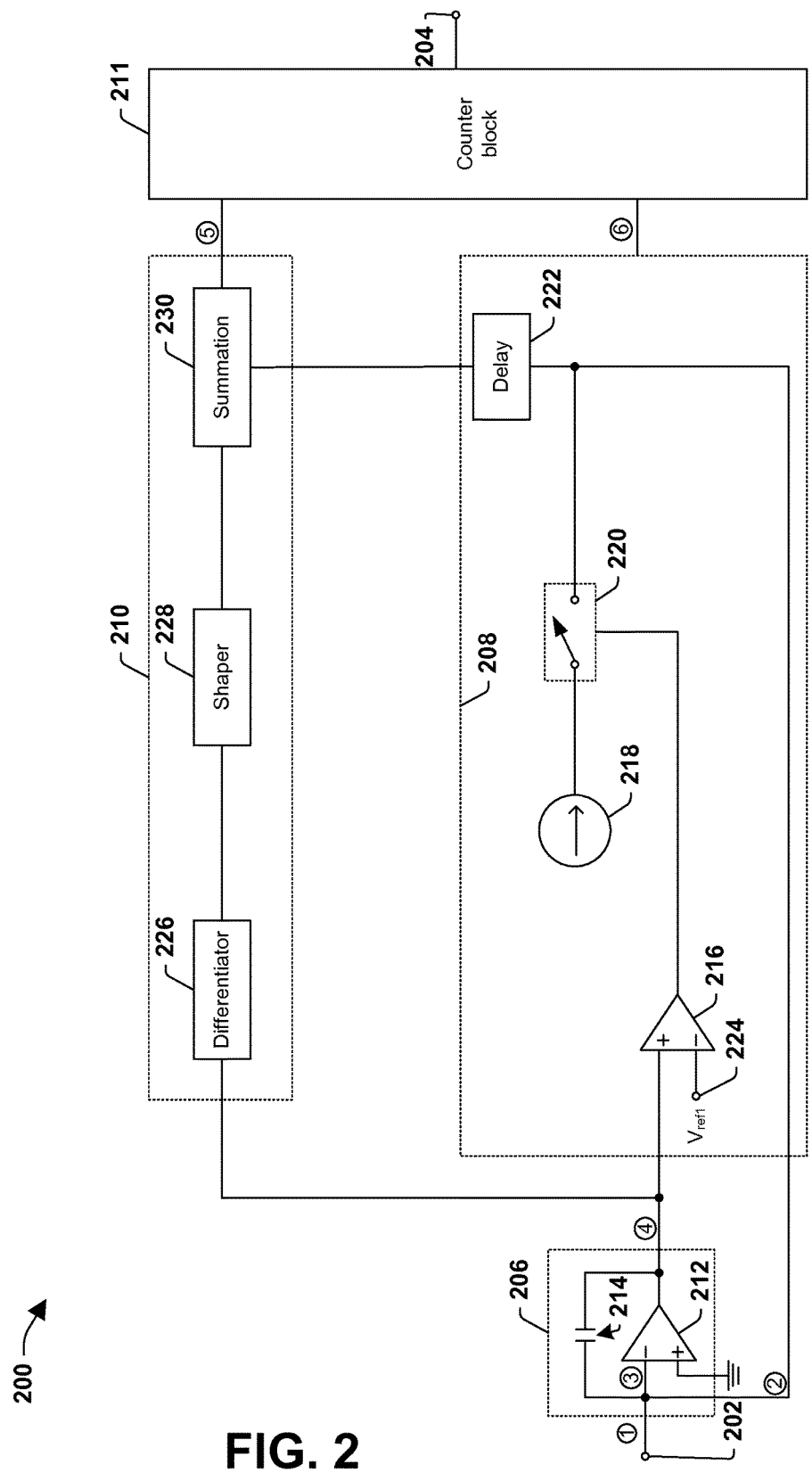
FIG. 2 illustrates a schematic diagram of an example electronics arrangement of a detector cell.

Referring to FIG. 2, a schematic diagram of an example electronics arrangement 200 of a detector cell is illustrated. When a radiation photon impinges a radiation detection element, charge is generated within the radiation detection element, which flows as a pulse of current into the electronics arrangement 200 via a first terminal 202 operably coupled to the radiation detection element. The amplitude of the pulse is typically indicative of an energy level of the radiation photon. The electronics arrangement is configured to convert the pulse into a voltage signal and to process the voltage signal to generate information about the detection event. Such information may include, among other things, when the detection event occurred and an energy level of the detected radiation photon. The information about various detection events is compiled at counter block (e.g., circuit) 211 configured to determine the number of detection events that occur within a measurement interval, based upon an output from a summation circuit 230 (e.g., to derive photon counting readings) and/or to determine an average number of detection events that occur within a measurement interval based upon an output from a charge injection circuit 208 (e.g., to derive integration readings). The compiled information is output from the electronics arrangement 200 at a second terminal 204 operably coupled to an image generator (e.g., 122 in FIG. 1) and/or other digital processing component (e.g., a threat analysis component, object identification component, etc.).

The electronics arrangement 200 comprises an integration circuit 206, the charge injection circuit 208, a photon counting circuit 210, and the counter block 211.

The integration circuit 206 (e.g., also referred to as a charge amplifier) is configured to convert the pulse into a voltage signal. In some embodiments, the integration circuit 206 comprises an operational-amplifier (op-amp) 212 and a capacitor 214 which are coupled in parallel to create a feedback loop. When a pulse of electrical charge is applied to the op-amp 212, a voltage potential at an input side of the op-amp 212 increases and a voltage potential with an inverse polarity appears at the output side of the op-amp 212. The voltage potential at the output side of the op-amp 212 is fed through the feedback loop, causing the voltage potential at the input-side to return to zero (e.g., nearly instantaneously) and/or causing the pulse to be integrated into a feedback capacitance of the capacitor 214. Such integration causes a voltage signal to be output from the integration circuit 206 that is substantially proportional to the charge received at the input terminal 202.

As radiation photons continue to be detected by the radiation detection element and converted to charge, the amplitude of the voltage signal may increase to an undesirable level (e.g., a level that may introduce a substantial amount of noise) due to the accumulation of stored charge at the capacitor 214. Accordingly, the charge injection circuit 208 is configured to inject charge into the integration circuit 206 when the voltage signal exceeds a specified threshold. The injected charge is typically opposite in polarity to the stored charge at the capacitor 214 and is configured to reset the integration circuit 206 by reducing (e.g., counteracting) an amount of stored charge at the capacitor 214. In this way, by resetting the integration circuit 206, an amplitude of the voltage signal output by the integration circuit 206 may be intermittently and/or periodically reduced (e.g., to limit a number of photons detected per reset, reduce noise in the electronics arrangement 200, etc.), for example. In some embodiments, a reset indication is applied to the counter block 211 when a reset is performed. In this way, the counter block 211 may count the number of resets per view to supplement information obtained from summation circuit 230, for example.

The charge injection circuit 208 comprises a comparator 216 (e.g., an op-amp), a charge source 218, a switching element 220, and a delay circuit 222. The comparator 216 is configured to compare the voltage signal output by the integration circuit 206 to a reference voltage signal associated with the specified threshold and applied at a terminal 224. When the comparator 216 senses that the voltage signal output by the integration circuit 206 exceeds the reference voltage signal (e.g., thus exceeding the specified threshold), the comparator 216 is configured to generate a first switch signal configured to activate the switching element 220 (e.g., causing the charge source 218 to be electrically coupled to the integration circuit 206). In some embodiments, the switching element 220 is configured to be activated for a specified period of time that causes a specified amount of charge to be injected into the integration circuit 206. In some embodiments, the number of resets that occur within a measurement interval is proportional to the average current generated in response to detector events within the measurement interval. For example, in some embodiments, the average current is equal to the number of resets multiplied by the amount of charge to be injected during each reset divided by the measurement interval. In some embodiments, the average current may be referred to as an integrator reading. Moreover, in some embodiments, the measurement interval is equal to a view and the number of resets that occur within the measurement interval is counted to yield the approximate a number of photons detected by the detector cell during a view.

The charge source 218 is configured to generate charge that will reduce the stored charge at the capacitor 214. For example, the charge source 218 is configured to inject charge into the integration circuit 206 when the charge source 218 is electrically coupled to the integration circuit 206. The injected charge is opposite in polarity to the stored charge and, in some embodiments, is proportional to the stored charge. For example, in some embodiments, the injected charge is inversely matched to the stored charge to reduce the amount of stored charge at the capacitor 214 to substantially zero or another predetermined amount.

As will be further described below, in some embodiments, the specified threshold (e.g., and thus the reference voltage signal) is selected to achieve a desired noise level for integration readings in counter block 211, which are derived from an output of the charge injection circuit 208. By way of example, in some embodiments, it is desirable that errors in an image (e.g., which may be manifested as artifacts in the image) be limited to errors due to quantum noise of the photons being measured (e.g., inherent in photon counting). Accordingly, in such embodiments, the specified threshold is selected to provide that a noise power introduced by the integration reading derived from the charge injection circuit 208 is less than the noise power of the quantum noise at a particular photon rate. That is, stated differently, the specified threshold is selected as a function of a signal-to-noise ratio of the photon counting circuit 210 at a particular photon rate.

Moreover, as will be further described below, in some embodiments, the specified threshold and/or the injected charge is a function of an energy spectrum of radiation photons emitted by the radiation source and/or a function of a source voltage applied to a radiation source (e.g., 116 in FIG. 1) configured to expose the photon counting detector array (e.g., 118 in FIG. 1) to radiation. By way of example, the amount of charge injected into the capacitor 214 via the charge source 218 may differ depending upon whether an average energy of emitted radiation photons is 60 keV or 100 keV. As another example, a first specified threshold may be defined for the voltage signal when 120 kV is applied to the radiation source and a second specified threshold, different than the first specified threshold, may be defined for the voltage signal when 150 kV is applied to the radiation source. Moreover, the specified threshold and/or the amount of charge injected into the capacitor 214 may vary during an examination of an object (e.g., 104 in FIG. 1) if the average energy of emitted radiation photons changes during the examination and/or the source voltage applied to the radiation source changes during the examination. By way of example, the source voltage applied to the radiation source (e.g., and the average energy of emitted radiation photons) may vary as the radiation source is rotated from viewing a side of a torso to a front of the torso. In some embodiments, concurrently with varying the source voltage during the rotation, the specified threshold and/or the output of the charge source 218 may be varied (e.g., proportionally with the change to the source voltage).

The switching element 220 is configured to be activated or deactivated as a function of the switch signal output by the comparator 216 (e.g., which is directly or indirectly coupled to the switching element 220). While the switching element 220 is activated (e.g., the switch is closed), the charge source 218 is electrically coupled to the integration circuit 206 and charge is injected into the integration circuit 206 via the charge source 218. The switching element 220 may comprise one or more suitable electronic switches such as insulated gate bipolar transistors (IGBTs), bipolar junction transistors (BJTs), field-effect transistors (FETs), metal-oxide semiconductor field-effect transistors (MOSFETs), gate turnoff thyristors (GTOs), integrated gate-commutated thyristors (IGCTs), and/or bidirectional triode thyristors (TRIACs), for example. In some embodiments, the switching of the switching element 220 may be a function of the comparator 216, and may not necessarily be directly connected to the comparator 216.

It may be appreciated that in some embodiments, charge generated at the radiation detection element may be applied to the integration circuit 206 concurrently with the injected charge being applied to the integration circuit 206. To distinguish the impact of the injected charge on the voltage signal from the impact of the charge generated at the radiation detection element, the injected charge may be further injected into the photon counting circuit 210 or a summation circuit 230 thereof. In this way, the photon counting circuit 210 and/or summation circuit 230 can differentiate the impact of the injected charge from the impact of the charge indicative of one or more detection events (e.g., to facilitate the counting of detection events that occur concurrently with the resetting of the integration circuit 206).

It some embodiments, it is desirable for the injected charge to be injected into the summation circuit 230 concurrently with a voltage signal indicative of the injected charge (e.g., yielded from the integration circuit 206). Accordingly, the charge injection circuit 208 comprises a delay circuit 222 configured to delay an application of the injected charge to the summation circuit 230 until a signal, yielded from the integration circuit 206 and indicative of the injected charge, is also applied to the summation circuit 230, for example.

The photon counting circuit 210 is configured to identify detection events and/or determine an energy level of respective detection events as a function of the voltage signal generated by the integration circuit 206. In this way, a record of detection events experienced by the detector cell is generated. The photon counting circuit 210 comprises a differentiator circuit 226, a shaper circuit 228, and the summation circuit 230. The differentiator circuit 226 is configured to generate a second voltage signal that is proportional to a rate of change of the voltage signal output by the integration circuit 206. Thus, an amplitude of the second voltage signal may be greater when the voltage signal output by the integration circuit 206 experiences a fast rate of change (e.g., when the voltage drops from 1.5 V to 1 V in 2 ns) than when the voltage signal output by the integration circuit 206 experiences a slower rate of change (e.g., when the voltage drops from 1.5 V to 1 V in 5 ns), for example.

The shaper circuit 228, such as a low-pass filter or other filter, is configured to shape the second voltage signal to generate a shaper signal. In this way, the second voltage signal may be smoothed, amplified, and/or otherwise adjusted to prepare the second voltage signal for the summation circuit 230.

The summation circuit 230 is configured to sum the shaper signal with the signal output from the delay circuit 222 or an equivalent thereof (e.g., indicative of the injected charge) to generate a signal (e.g., a voltage signal and/or a current signal). Respective pulses in the signal are indicative of a detection event and the magnitude of a pulse is indicative of an energy associated with the detection event (e.g., energy of the detected photon). Moreover, by summing the shaper signal with the signal output from the delay circuit 222, detection events that occur substantially concurrently with the injection of charge into the integration circuit 206 can be identified. That is, stated differently, the summation can cause the impact of the injected charge on a voltage pulse emitted from the integration circuit 206 to be removed such that the signal output from the summation circuit 230 is merely indicative of detection events (e.g., and not indicative of injected charge), for example.

The counter block 211 is configured to generate data indicative of detection events based upon the signal output by the summation circuit 230 and the signal output by the charge injection circuit 208. The data may include photon counting data and integration data. Photon counting data refers to data generated based upon the signal output by the summation circuit 230 and may be indicative of photon counting readings (e.g., which may include a detection time and detection location of respective detection events). Integration data refers to data generated based upon the signal output by the charge injection circuit 208 and may be indicative of integration readings (e.g., which may include an amount of time between respective resets). In some embodiments, the counter block 211 is configured to determine a number of detection events that occur per measurement interval (e.g., per view) based upon the photon counting data and/or the integration data.

In some embodiments, the data output by the counter block 211 and used for imaging purposes (e.g., to generate an image) may be based upon the number of detection events identified within a measurement interval (e.g., a view). By way of example, when fewer than a predetermined number of detection events are identified during a measurement interval (e.g., as determined based upon the number of pulses in the signal output by the summation circuit 230 during the measurement interval and/or the number of resets by the charge injection circuit 208 during the measurement interval), the photon counting data may be output from the counter block 211 when a request for data pertaining to the measurement interval is received by the counter block 211 (e.g., and thus photon counting data is used for imaging purposes). When more than the predetermined number of detection events are identified during a measurement interval, the integration data may be output from the counter block 211 when a request for data pertaining to the measurement interval is received by the counter block 211 (e.g., and thus integration data is used for imaging purposes). In still other embodiments, the integration data is used to supplement the photon counting data when a request is received pertaining to a measurement interval during which more than the predetermined number of detection events are identified. In this way, imaging data may be generated based upon the number of detection events that occur within a measurement interval using photon counting techniques (e.g., photon counting readings) and/or the effective or average number of detection events using integration techniques (e.g., photon integration readings).

Figure 3A:
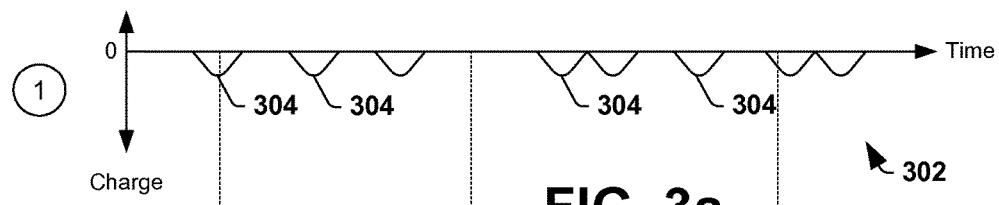
FIG. 3a illustrates an example current signal yielded from a radiation detection element of a detector cell.
Figure 3B:
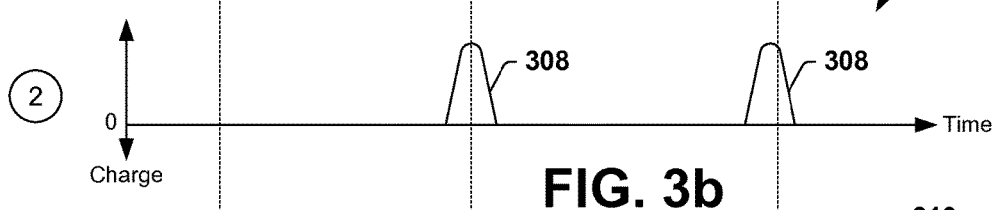
FIG. 3b illustrates an example current signal yielded from a charge injection circuit of an electronics arrangement of a detector cell.
Figure 3C:
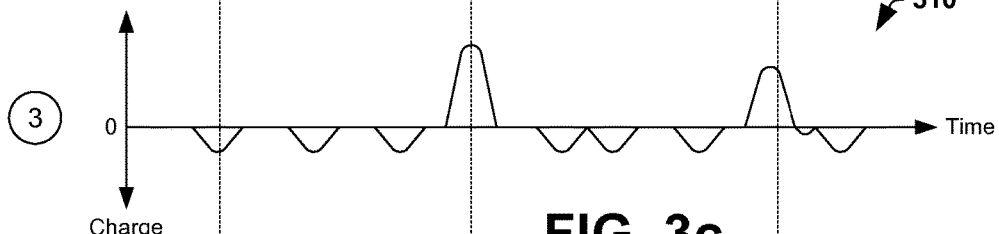
FIG. 3c illustrates an example current signal supplied to an integration circuit of an electronics arrangement of a detector cell.

FIGS. 3a-c represent current signals 302, 306, and 310 at various reference points at a front-end of an integration circuit (e.g., 206 in FIG. 2). For purposes of this example, noise contributions to the current signals are not illustrated.

Referring to FIG. 3a, a first current signal 302, measured at a first reference point (e.g., labeled 1 in FIG. 2), is illustrated. The first current signal is indicative of the amount of charge produced over time by a radiation detection element of a detector array (e.g., 118 in FIG. 1). Respective pulses 304 of the first current signal 302 correspond to a detection event (e.g., detection of a radiation photon). In some embodiments, the amplitude of a pulse 304 is indicative of the energy of the radiation photon. For purposes of this example, it may be assumed that the energy of respective radiation photons is substantially the same. However, in some applications, detected radiation photons may vary in energy and thus the amplitude of a first pulse may be different than the amplitude of a second pulse, for example.

Referring to FIG. 3b, a second current signal 306, measured at a second reference point (e.g., labeled 2 in FIG. 2), is illustrated. The second current signal is indicative of the amount of charge to be injected into an integration circuit (e.g., 206 in FIG. 2). When it is desirable to reset the integration circuit, a charge source (e.g., 218 in FIG. 2) may inject charge into the integration circuit. A pulse 308 in the second current signal 306 (e.g., around times T2 and T3) is indicative of the injected charge. At other times, when it is not desirable to reset the integration circuit, the charge source may be electrically decoupled from the integration circuit and thus the current signal 306 at the second reference point may measure substantially zero or some predetermined value, for example.

Referring to FIG. 3c, a third current signal 310, measured at a third reference point (e.g., labeled 3 in FIG. 2), is illustrated. The third current signal 310 is indicative of the combined charge of the first current signal 302 and the second current signal 306. The amplitude of the third current signal 310 is typically substantially the sum of the amplitude of the first current signal 302 and the amplitude of the second current signal 306.

Figure 4A:
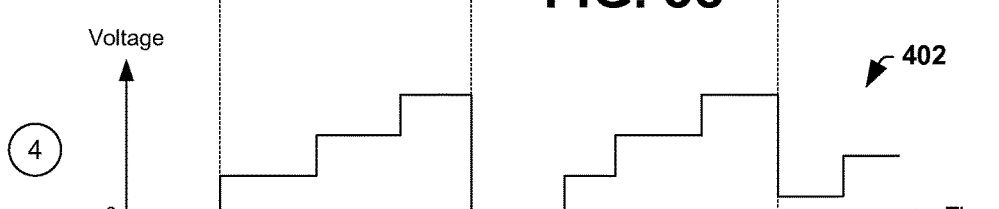
FIG. 4a illustrates an example voltage signal output from an integration circuit of an electronics arrangement of a detector cell.

Referring to FIG. 4a, a voltage signal 402 output from the integration circuit and measured at a fourth reference point (e.g., labeled 4 in FIG. 2) is illustrated. The amplitude of the voltage signal 402 is a function of the combined current signal and the stored charge in the capacitor (e.g., 214 in FIG. 2). By way of example, the amplitude of the voltage signal 402 increases when additional charge is applied to the capacitor due to a detection event and decreases when injected charge is applied to the capacitor (e.g., because the stored charge is discharged).

Referring to FIGS. 3a-c and 4a in combination, at a first instant in time T1, when a first detection event occurs and the integration circuit is not being reset, the amplitude of the voltage signal 402 is proportional to the amplitude of the first current signal 302 (e.g., and is thus proportional to the charge generated in response to the detection event). As additional radiation photons are detected, the amplitude of the voltage signal 402 increases (e.g., as illustrated by the stair-step increases) because additional charge is added to the stored charge of the capacitor. When the voltage signal 402 exceeds a specified threshold, the charge source injects charge into the integration circuit to reset the integration circuit (e.g., to discharge the capacitor). If no detection event occurs during the reset, as illustrated at a second instant in time T2, the amplitude of the voltage signal 402 decreases to substantially zero (e.g., or the predetermined value) upon the injected charge being applied to the integration circuit. If a detection event occurs concurrently with the reset, as illustrated at a third instant in time T3, the amplitude of the voltage signal 402 may be reduced to a lesser extent due to the charge of the detection event being combined with the injected charge.

Figure 4B:
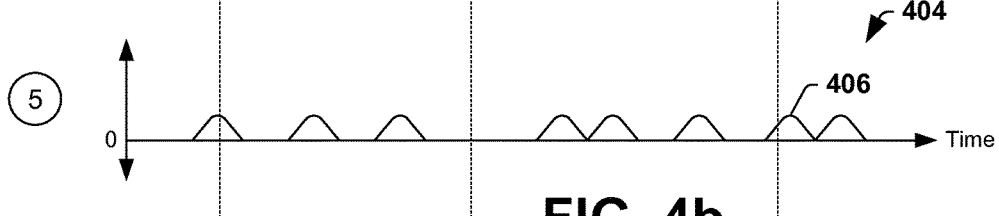
FIG. 4b illustrates an example current and/or voltage signal output from a summation circuit of an electronics arrangement of a detector cell.

Referring to FIG. 4b, a signal 404 (e.g., which may be a current signal or a voltage signal) output from a summation circuit (e.g., 230 in FIG. 2) and measured at a fifth reference point (e.g., labeled 5 in FIG. 2) is illustrated. The signal 404 is, for example, the inverse of the current signal 302 measured at reference point 1 in FIG. 2 as the summation circuit has reduced (e.g., to zero) an impact of the injected charge. Thus, even when a detection event occurs concurrently with a reset, as illustrated at the third instant in time T3, the summation circuit identifies a detection event and generates a pulse 406 in the signal 404.

Figure 4C:
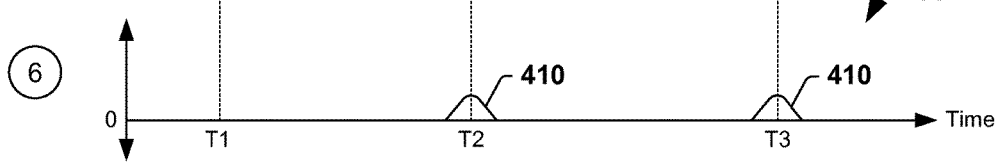
FIG. 4c illustrates an example current and/or voltage signal output from a charge injection circuit of an electronics arrangement of a detector cell.

Referring to FIG. 4c, a signal (e.g., which may be a current signal or a voltage signal) output from the charge injection circuit (e.g., 208 in FIG. 2) and measured at a sixth reference point (labeled 6 in FIG. 2) is illustrated. Pulses 410 in the signal 408 are indicative of resets and may be used by a counter (e.g., 211 in FIG. 2) to count a number of resets per measurement interval, for example.

Referring to FIG. 5, a table 500 is provided describing example radiation imaging parameters relevant for computing the specified threshold (e.g., for resetting an integration circuit) and/or the amount of charge to be injected into the integration circuit during a reset. Several example scenarios are provided to illustrate how the specified threshold and/or the amount of injected charge may change based upon changes to one or more other radiation imaging parameters.

For purposes of this example, the radiation imaging system is a CT system comprising a cadmium zinc telluride (CdZnTe) detector array and the radiation energy of radiation photons output by the radiation source is approximately 60 keV (e.g., where a 60 keV event corresponds to approximately 12000 electrons). Thus, the charge generated in response to a detection event is approximately $1.9 \times 10^{-15}$ C.

A first row 502 of the table 500 describes the maximum photon countable radiation photons a detector cell can detect per view wherein the error in the magnitude of the counts per view is commensurate with the statistical error (e.g., where the error in the mean of counted photons is substantially equal to or nearing the square root of the number of input photons (e.g., where the inherent noise in photon counting is the square root of the number of input photons)). The maximum photon countable radiation photons a detector cell can detect per view may depend upon, among other things, a radiation flux rate of emitted radiation, a surface area of the detector cell, conversation material of the detector cell, and/or circuit parameters, for example.

A second row 504 of the table 500 describes the signal-to-noise ratio inherent in photon counting at this maximum photon countable rate, and is dependent upon the number of photons counted at that point. The signal-to-noise ratio may be computed as the square root of the maximum photon countable rate.

A third row 506 represents an integrator noise factor. The integrator noise factor is designed such that the integrator noise is a noise factor times less than the counting noise at the maximum photon countable rate. In doing this, no appreciable signal-to-noise reading error is introduced when bridging between photon counting readings determined based upon an output of a summation circuit (e.g., 230 in FIG. 2) and photon integration readings determined based upon an output of a charge injection circuit (e.g., 208 in FIG. 2). This factor may be specified by a user and limits how much noise can be introduced by the integration circuit in relation to the inherent noise in photon counting. That is, stated differently, the integrator noise factor describes how much better the noise performance of the integration circuit (e.g., 206 in FIG. 2) is to be relative to the photon counting circuit at the maximum photon countable rate (e.g., 210 in FIG. 2) (e.g., a factor of 10 would indicate that the integration circuit is to introduce 10 times less noise than the photon counting circuit at the maximum photon countable rate).

A fourth row 508 represents the desired (e.g., maximum) integration noise associated with and/or to be introduced by the integration circuit at the maximum photon countable rate. The desired integration noise is a function of (e.g., a quotient of) the signal-to-noise ratio and the integrator noise factor. When the integrator noise factor is greater than 1 (e.g., as is typically the case), the desired integration noise will be less than the signal-to-noise ratio of the photon counting circuit (e.g., to inhibit introducing additional noise into the data acquisition system by the integration circuit).

A fifth row 510 represents the root mean square (RMS) quantization error inherent in the quantization process of the integration circuit. The RMS quantization error is defined, in an example, as 1 Least Significant Bit (LSB) over the square root of 12 (e.g., where LSB corresponds to a reset).

A sixth row 512 represents a number of photons to be counted per reset (e.g., per LSB) of the integration circuit in order to obtain an adequate signal-to-noise ratio for the integration readings. The number of photons to be counted per reset (e.g., per LSB) is a function of (e.g., the quotient of) the maximum integration circuit noise and the RMS quantization error. By way of example, in the first scenario, approximately 11 photons are to be counted between resets of the integration circuit, or stated differently, there is an average of 11 photons per LSB of the integrator reading.

A seventh row 514 represents the amount of charge to be injected into the integration circuit during the reset. The amount of charge to be injected is a function of (e.g., the product of) the signal-to-noise ratio at the maximum photon countable rate (e.g., represented in the second row 504), the integrator noise factor (e.g., represented in the third row 506), the RMS quantization error (e.g., represented in the fifth row 510), and the average charge generated by a detection event (e.g., which for a 60 keV event typically equals $12000*10^{-19}$ or $1.93*10^{-15}$).

Figure 6:
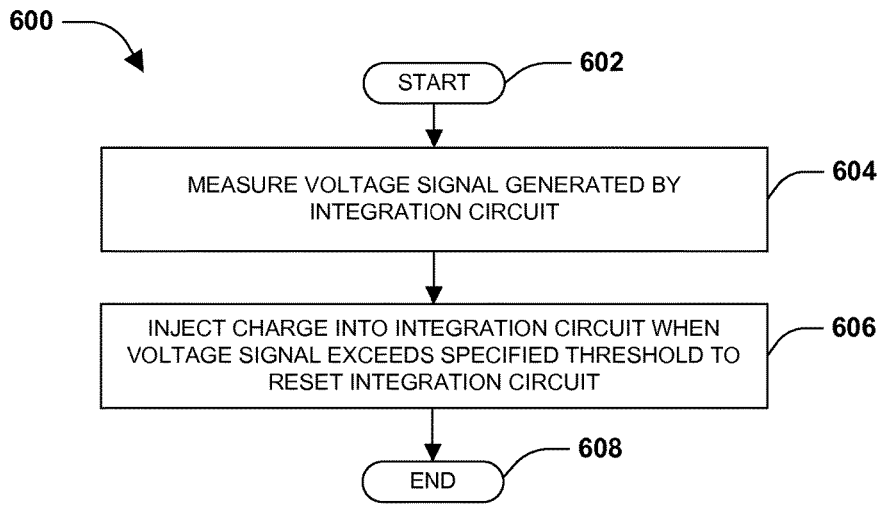
FIG. 6 is a flow diagram illustrating an example method for resetting an integration circuit of a photon counting detector array.

Referring to FIG. 6, a flow diagram of an example method 600 for resetting an integration circuit of a photon counting detector array is provided.

The example method 600 starts at 602, and a voltage signal generated by the integration circuit is measured at 604. The voltage signal is indicative of a number of detection events on a detector cell since a last reset of the integration circuit. In some embodiments, the voltage signal is further indicative of the radiation energy of respective detection events. For example, an increase in the amplitude of the voltage signal may be indicative of a detection event and a magnitude in the increase may be indicative of the radiation energy associated with the detection event.

In some embodiments, measuring the voltage signal at 604 comprises sensing whether the voltage signal has exceeded a specified threshold (e.g., a reference voltage). The reference voltage may be set as a function of the energy spectrum of emitted radiation, a source voltage applied to a radiation source, and/or a flux rate of radiation. Moreover, in some embodiments, the specified threshold is set to limit a number of photons detected between resets to a specified value (e.g., 11 photons) based upon a desired (e.g., maximum) amount of noise to be introduced into the photon counting by the integration circuit, for example.

At 606 in the example method 600, injected charge is injected into the integration circuit when the voltage signal exceeds the specified threshold. The injected charge is configured to reset the integration circuit. More particularly, the injected charge is configured to discharge a capacitor of the integration circuit and/or counteract stored charge that has been stored in the capacitor since a last reset. In some embodiments, the injected charge is opposite in polarity to the stored charged. In some embodiments, the injected charge is substantially proportional to the stored charge.

In some embodiments, the amount of charge to be injected into the integration circuit is determined based upon a number of radiation photons to be detected between resets. For example, it may be desirable to reset the integration circuit after every 11 detection events. 11 detection events may cause a charge of approximately $2.1*10^{-14}$ coulombs to be stored in the capacitor (e.g., where the charge generated by a detection event may be a function of an energy spectrum of emitted radiation and/or a conversion material of the detector cell). Accordingly, the amount of charge injected into the integration circuit may be approximately $-2.1*10^{-14}$ coulombs to counteract the approximately $2.1*10^{-14}$ coulombs stored in the capacitor.

In some embodiments, the amount of charge to be injected into the integration circuit is a function of a source voltage applied to the radiation source. Accordingly, establishing the amount of injected charge may comprise determining a source voltage applied to a radiation source configured to expose the photon counting detector array to radiation. Moreover, the amount of injected charge may change if the source voltage is varied during an examination of an object and/or between examinations of objects, for example.

In some embodiments, the injected charge is further injected into a photon counting circuit or a summation circuit thereof configured to determine a number of detection events on the detector cell and/or the radiation energy of respective radiation photons detected by the detector cell. In this way, an impact of the injected charge on the integration circuit and/or a voltage signal produced by the integration circuit can be substantially negated by the photon counting circuit and/or summation circuit, for example (e.g., such that detection events are not over counted and/or under counted due to the injected charge).

The example method 600 ends at 608.

Figure 7:
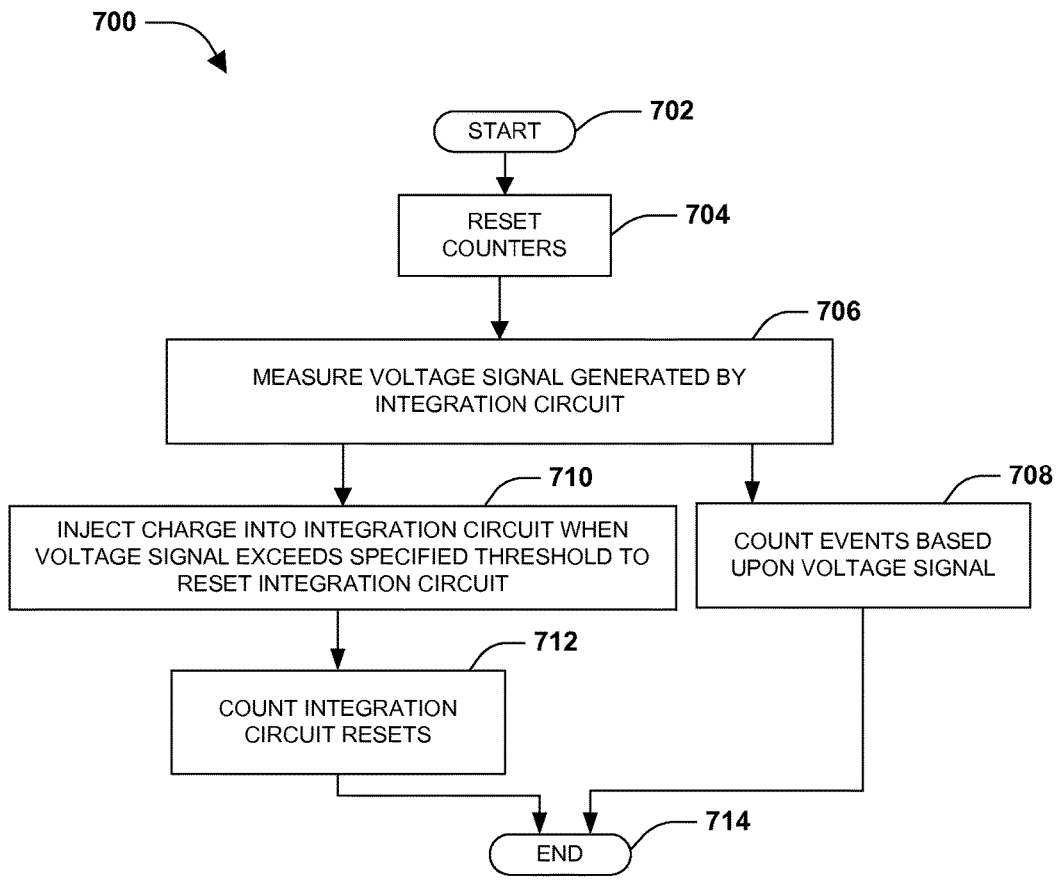
FIG. 7 is a flow diagram illustrating an example method for determining a number of photons counted during a measurement interval.

Referring to FIG. 7, an example method 700 for determining a number of photons counted during a measurement interval (e.g., a view, portion of view, or other definable range) is provided. The method 700 starts at 702 and counters of a counting block (e.g., 211 in FIG. 2) are reset at 704 when a measurement interval begins. By way of example, the counting circuit may comprise two or more counters that are reset at 704. A first counter of the counting circuit may be configured to count detection events (e.g., or detection events corresponding to a specified energy spectrum) within a measurement interval based upon a signal output from a summation circuit (e.g., 230 in FIG. 2) and a second counter of the counting circuit may be configured to count resets within a measurement interval based upon a signal output from a charge injection circuit (e.g., 208 in FIG. 2).

At 706, a voltage signal, generated by an integration circuit (e.g., 206 in FIG. 2) and/or derived therefrom, may be measured during the measurement interval by one or more components. By way of example, a summation circuit (e.g., 230 in FIG. 2) may measure the voltage signal to identify detection events and/or a comparator (e.g., 216 in FIG. 2) may measure the voltage signal to determine when to reset the integration circuit.

At 708, detection events identified during the measurement interval are counted. By way of example, the summation circuit may generate a signal comprising pulses indicative of detection events, which may be output to the counting circuit. Using the pulses, the counting circuit may count detection events to determine a number of detection events that occurred within the measurement interval.

At 710, charge is injected into the integration circuit when the voltage signal exceeds a specified threshold to reset the integration circuit, and at 712 in the example method 700, integration circuit resets are counted. By way of example, the comparator may output a switching signal when the voltage signal exceeds the specified threshold. The switching signal may, in turn, activate a charge source (e.g., 218 in FIG. 2) that injects a specified amount of charge to the integration circuit when activated, causing the integration circuit to be reset. Moreover, a charge integrating circuit (e.g., comprising the comparator and/or charge source) may output a pulse to the counter block (e.g. counter circuit) indicating that the integration circuit has been reset. The counter block may be configured to count these pulses to determine the number of resets that occurred within the measurement interval (e.g., and thus an average number of photons counted within the measurement interval).

The example method 700 ends at 714 when the measurement interval ends. It may be appreciated that the example method 700 may be repeated for successive measurement intervals to determine the number of detections events and/or average number of detection events for multiple measurement intervals, for example.

Figure 8:
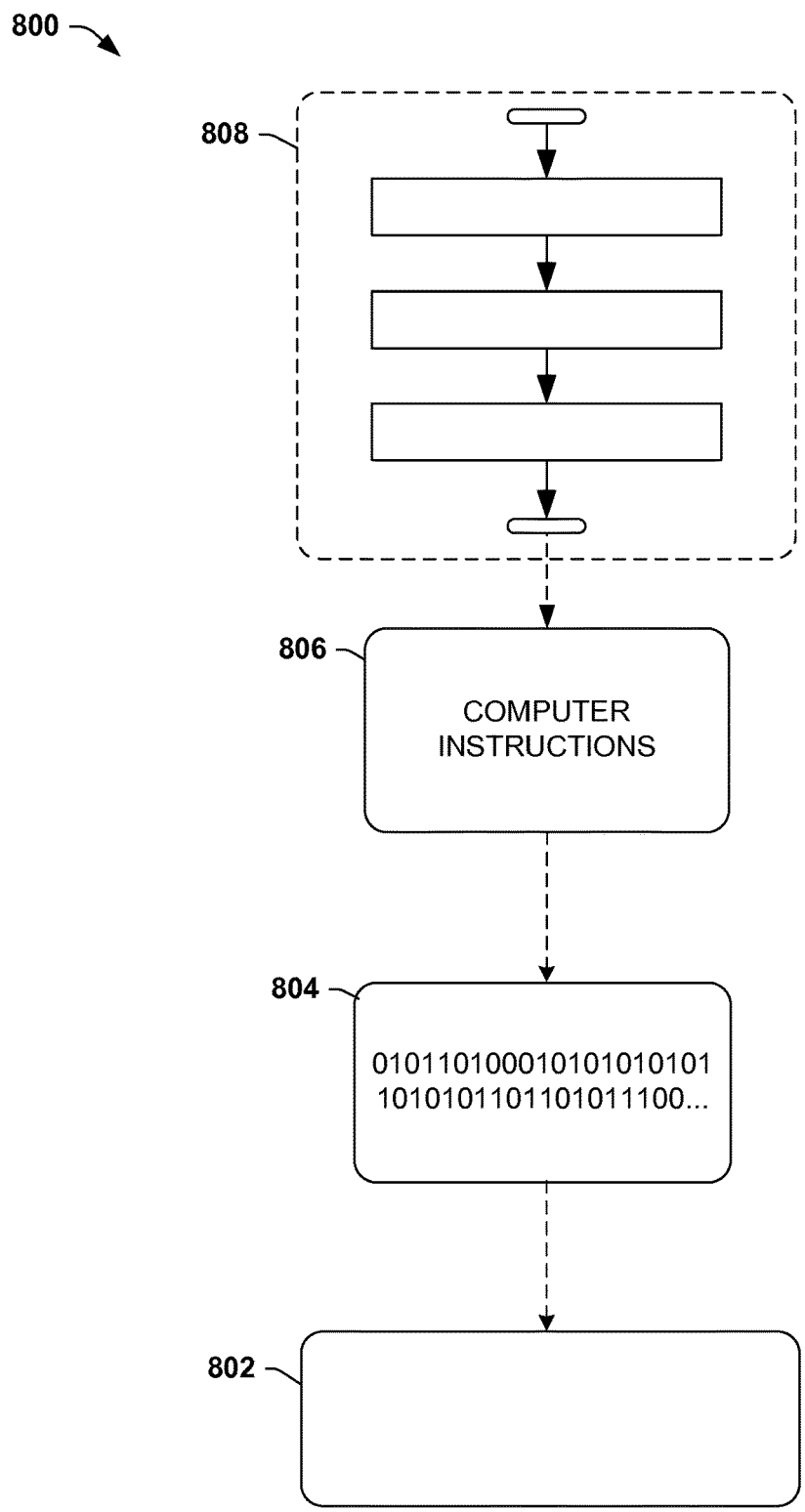
FIG. 8 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 8, wherein the implementation 800 comprises a computer-readable medium 802 (e.g., a flash drive, CD-R, DVD-R, application-specific integrated circuit (ASIC), field-programmable gate array (FPGA), a platter of a hard disk drive, etc.), on which is encoded computer-readable data 804. This computer-readable data 804 in turn comprises a set of processor-executable instructions 806 configured to operate according to one or more of the principles set forth herein. In one such embodiment 800, the processor-executable instructions 806 may be configured to perform a method 808 when executed via a processing unit, such as at least some of the example method 600 of FIG. 6 and/or example method 700 of FIG. 7. In another such embodiment, the processor-executable instructions 806 may be configured to implement a system, such as at least some of the example system 100 of FIG. 1. Many such computer-readable media may be devised by those of ordinary skill in the art that are configured to operate in accordance with one or more of the techniques presented herein. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to structural features or methodological acts, it is to be understood that the subject matter of the appended claims is not necessarily limited to the specific features or acts described above. Rather, the specific features and acts described above are disclosed as embodiment forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". The claimed subject matter may be implemented as a method, apparatus, or article of manufacture (e.g., as software, firmware, hardware, or any combination thereof).

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B" or two different (or identical) channels or the same channel).

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A photon counting detector array, comprising:
   an electronics arrangement comprising:
      an integration circuit configured to integrate charge generated by a detector cell of the photon counting detector array to generate a voltage signal;
      a photon counting circuit configured to receive the voltage signal from the integration circuit and identify a detection event using the voltage signal; and
      a charge source configured to inject an injected charge into the integration circuit in response to the voltage signal exceeding a specified threshold, the injected charge configured to reset the integration circuit.

2. The photon counting detector array of claim 1, wherein the injected charge is substantially inversely proportional to a stored charge stored in the integration circuit.

3. The photon counting detector array of claim 1, wherein the specified threshold is a function of a signal-to-noise ratio of the photon counting circuit, the signal-to-noise ratio determined according to a maximum number of photons countable by the detector cell based upon design specifications of the photon counting detector array.

4. The photon counting detector array of claim 1, wherein the injected charge is injected into the photon counting circuit.

5. The photon counting detector array of claim 1, wherein a radiation source is configured to emit radiation toward the photon counting detector array and the injected charge is set based upon a source voltage applied to the radiation source to generate the radiation.

6. The photon counting detector array of claim 1, comprising:
   a comparator configured to generate a switch signal in response to the voltage signal exceeding the specified threshold.

7. The photon counting detector array of claim 6, comprising:
   a switching element configured to electrically couple the charge source to the integration circuit in response to receiving the switch signal.

8. The photon counting detector array of claim 1, wherein the specified threshold is a function of a desired number of photons to be counted before the reset.

9. The photon counting detector array of claim 8, wherein the desired number of photons to be counted is a function of a desired integration noise associated with the integration circuit.

10. The photon counting detector array of claim 1, comprising a counter block configured to count resets to the integration circuit during a measurement interval to determine an average current output by a radiation detection element of the detector cell over the measurement interval.

11. A method for resetting an integration circuit, comprising:
   measuring a voltage signal generated by the integration circuit and produced from electrical charge generated by a detector cell of a photon counting detector array, the voltage signal indicative of a number of detection events on the detector cell since a last reset of the integration circuit;
   injecting an injected charge into the integration circuit when the voltage signal exceeds a specified threshold, the injected charge configured to reset the integration circuit;
   applying the voltage signal to a photon counting circuit; and
   detecting a detection event at the photon counting circuit as a function of the voltage signal.

12. The method of claim 11, wherein the injected charge is opposite in polarity to a stored charge stored by the integration circuit since the last reset of the integration circuit.

13. The method of claim 12, wherein the injected charge is substantially proportional to the stored charge.

14. The method of claim 11, comprising:
   determining a source voltage applied to a radiation source configured to expose the photon counting detector array to radiation; and
   setting the specified threshold as a function of the source voltage.

15. The method of claim 11, comprising:
   determining a source voltage applied to a radiation source configured to expose the photon counting detector array to radiation; and
   establishing the injected charge as a function of the source voltage.

16. The method of claim 11, wherein the injected charge is configured to counteract a stored charge stored by the integration circuit since the last reset of the integration circuit.

17. The method of claim 11, comprising:
   generating a second voltage signal at the photon counting circuit, wherein the second voltage signal is proportional to a rate of change of the voltage signal.

18. The method of claim 17, wherein the injecting an injected charge comprises generating a second signal, and the method comprises introducing a delay into the second signal to generate a delayed signal.

19. The method of claim 18, comprising:
   summing, at the photon counting circuit, the second voltage signal and the delayed signal.

20. A radiation imaging system, comprising:
   an ionizing radiation source; and
   a photon counting detector array comprising one or more detector cells configured to detect radiation from the ionizing radiation source, a first detector cell comprising:
      a radiation conversion element configured to convert radiation detected by the first detector cell into charge; and
      an electronics arrangement configured to determine a number of detection events on the first detector cell based upon the charge, the electronics arrangement comprising:

an integration circuit configured to integrate the charge to generate a voltage signal;
a photon counting circuit configured to receive the voltage signal and identify a detection event as a function of the voltage signal; and
a charge injection circuit configured to inject an injected charge into the integration circuit in response to the voltage signal exceeding a specified threshold.

* * * * *